United States Patent
Zhang et al.

(10) Patent No.: US 12,552,774 B2
(45) Date of Patent: Feb. 17, 2026

(54) METHOD FOR PREPARING PYROTINIB

(71) Applicant: SUZHOU FUSHILAI PHARMACEUTICAL CO., LTD, Suzhou (CN)

(72) Inventors: Xiaohong Zhang, Suzhou (CN); Yongxing Wang, Suzhou (CN); Xiaotong Sun, Suzhou (CN); Qiuyue Han, Suzhou (CN)

(73) Assignee: SUZHOU FUSHILAI PHARMACEUTICAL CO., LTD, Suzhou (CN)

( * ) Notice: Subject to any disclaimer, the term of this patent is extended or adjusted under 35 U.S.C. 154(b) by 639 days.

(21) Appl. No.: 18/041,160

(22) PCT Filed: Mar. 5, 2021

(86) PCT No.: PCT/CN2021/079228
§ 371 (c)(1),
(2) Date: Feb. 9, 2023

(87) PCT Pub. No.: WO2022/088573
PCT Pub. Date: May 5, 2022

(65) Prior Publication Data
US 2023/0303523 A1 Sep. 28, 2023

(30) Foreign Application Priority Data
Oct. 29, 2020 (CN) .......................... 202011176723.9

(51) Int. Cl.
C07D 401/14 (2006.01)
(52) U.S. Cl.
CPC .................. C07D 401/14 (2013.01)
(58) Field of Classification Search
None
See application file for complete search history.

(56) References Cited

U.S. PATENT DOCUMENTS 7,982,043 B2 * 7/2011 Wissner ............... C07D 413/12
546/160

FOREIGN PATENT DOCUMENTS

| CN | 102020639 A | 4/2011 | |
| CN | 102675287 A | 9/2012 | |
| CN | 103265530 A | 8/2013 | |
| CN | 103275002 A | 9/2013 | |
| CN | 105330646 A * | 2/2016 | ........... C07D 401/12 |
| CN | 106905234 A * | 6/2017 | ........... C07D 215/54 |
| CN | 108314639 A | 7/2018 | |
| CN | 110724086 A | 1/2020 | |
| CN | 112279838 A | 1/2021 | |
| WO | 2019076316 A1 | 4/2019 | |
| WO | 2020211860 A1 | 10/2020 | |

OTHER PUBLICATIONS

International Search Report issued by ISA/CN in connection with PCT/CN2021/079228 dated Aug. 12, 2021.

* cited by examiner

Primary Examiner — Jeffrey S Lundgren
Assistant Examiner — Sara Elizabeth Townsley
(74) Attorney, Agent, or Firm — Levenfeld Pearlstein, LLC

(57) ABSTRACT

A method for preparing pyrotinib, which belongs to the technical field of chemical synthesis of medicines. The method comprises the following steps: 1. preparing R,E-N-(-2-hydroxy-4-nitrophenyl)-3-(-1-methylpyrrolidin-2-yl) acrylamide; 2. preparing (R,E)-N-(2-ethoxy-4-nitrophenyl)-3-(1-methylpyrrolidin-2-yl)acrylamide; 3. preparing (R,E)-N-(4-amino-2-ethoxyphenyl)-3-(1-methylpyrrolidin-2-yl) acrylamide; 4. preparing (2E)-N-(4-amino-3-cyano-7-ethoxyquinolin-6-yl)-3-[(2R)-1-methylpyrrolidin-2-yl] acrylamide; and 5. preparing pyrotinib. The method has the advantages of the raw materials being readily available and the process being simple, economical and environmentally friendly. The method is beneficial for improving and controlling the quality of a final product bulk drug.

10 Claims, No Drawings

METHOD FOR PREPARING PYROTINIB

TECHNICAL FIELD

The present application belongs to the technical field of chemical synthesis of pharmaceuticals, and relates to a method for preparing pyrotinib.

BACKGROUND

Pyrotinib is an irreversible tyrosine kinase inhibitor with dual targets of human epidermal growth factor receptor 2 (HER2) and epidermal growth factor receptor (EGFR) independently developed by China Jiangsu Hengrui Pharmaceuticals Co., Ltd. Pyrotinib can covalently bond to adenosine triphosphate (ATP) binding sites in the kinase regions HER2 and EGFR in cells, prevent the formation of homodimers and heterodimers of HER2 and EGFR in tumor cells, suppress the phosphorylation, block the activation of downstream signal pathways, and thereby inhibit the growth of tumor cells. In August, 2018, the China Food and Drug Administration (CFDA) officially approved the marketing of pyrotinib maleate tablets for treating the patients with recurrent or metastatic breast cancer who are positive for epidermal growth factor receptor 2 (HER2) and have not received or received trastuzumab before.

The chemical name of pyrotinib is (2E)-N-[4-[[3-chloro-4-[(pyrid-2-yl)methoxy]phenyl]amino]-3-cyano-7-ethoxy-quinoline-6-yl]-3-[(2R)-1-methylpyrrolidin-2-yl)acrylamide. Based on the pharmacophore structure of neratinib, a double-target inhibitor (HER2 and EGFR), the main structure of neratinib, that is, the quinoline core and (pyridine-2-yl)methoxybenzene ring, is reserved in the structural design of pyrotinib, and only the acrylamide side chain is changed into a chiral 3-[(2R)-1-methylpyrrolidin-2-yl]acrylamide group (as shown in the following). Patent publication number CN102933574A reports that pyrotinib has significant advantages in drug efficacy, and superior advantages than neratinib in tumor-inhibition strength, bioavailability and safety. Patent CN103265530A introduces the preparation method of neratinib.

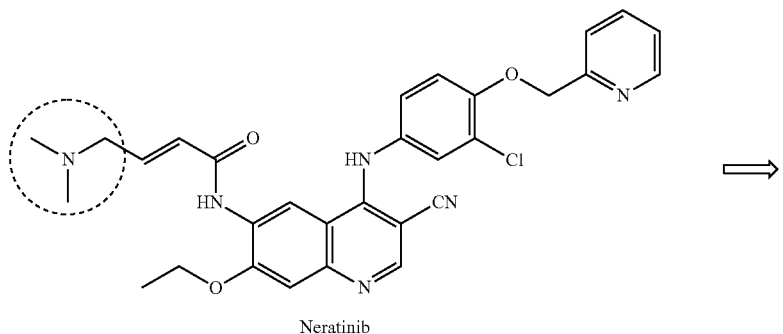

Neratinib

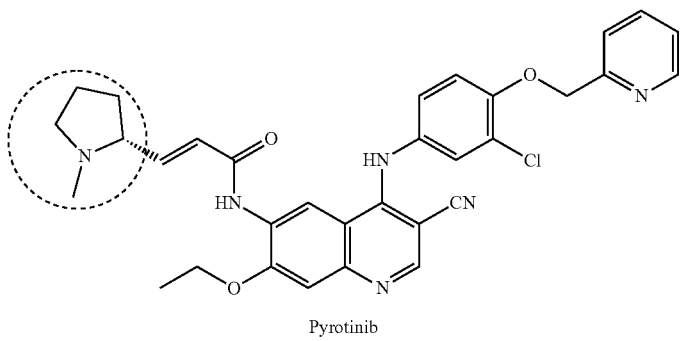

Pyrotinib

The existing patents and literatures about the preparation methods of pyrotinib basically follow the direction and strategy of the main synthetic route of neratinib, which can be summarized as the following three synthetic routes. In the routes, Route 1 and Route 2 adopt different methods to prepare the same key intermediate (formula 1), and then the compound of formula 1 is subjected to amidation reaction with (2E)-3-[(2R)-1-methylpyrrolidin-2-yl] acryloyl chloride to obtain pyrotinib; in Route 3, the compound of formula 1 is first subjected to amidation reaction with diethylphosphonoacetic acid under the action of a condensation agent to produce an intermediate (formula 2) containing the diethyl phosphate side chain, and then the intermediate is subjected to Wittig-Horner reaction with (2R)-1-methylpyrrolidin-2-formaldehyde under the condition of strong alkali and ultralow temperature, and condensed to form olefinic bonds to obtain pyrotinib.

Route 1 (WO2005034955A1, WO2017186140A1) is shown below. In the first step, excessive highly toxic and strongly acidic phosphorus oxychloride or thionyl chloride is required for chlorination reaction, and the post-treatment produces a large amount of highly corrosive and irritating waste liquid. The operation is complicated and tedious, the reaction time is long (more than 10 h), and the yield and purity are not high, so the route is not suitable for industrial scale-up production.

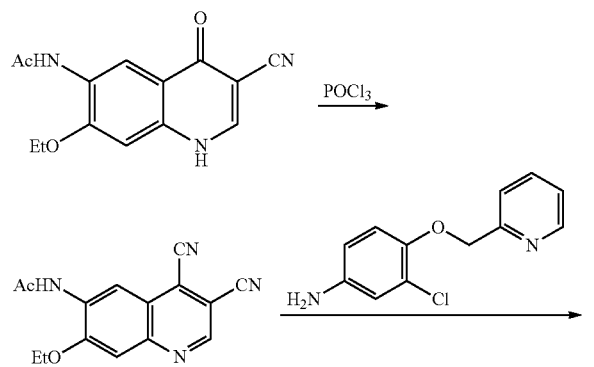

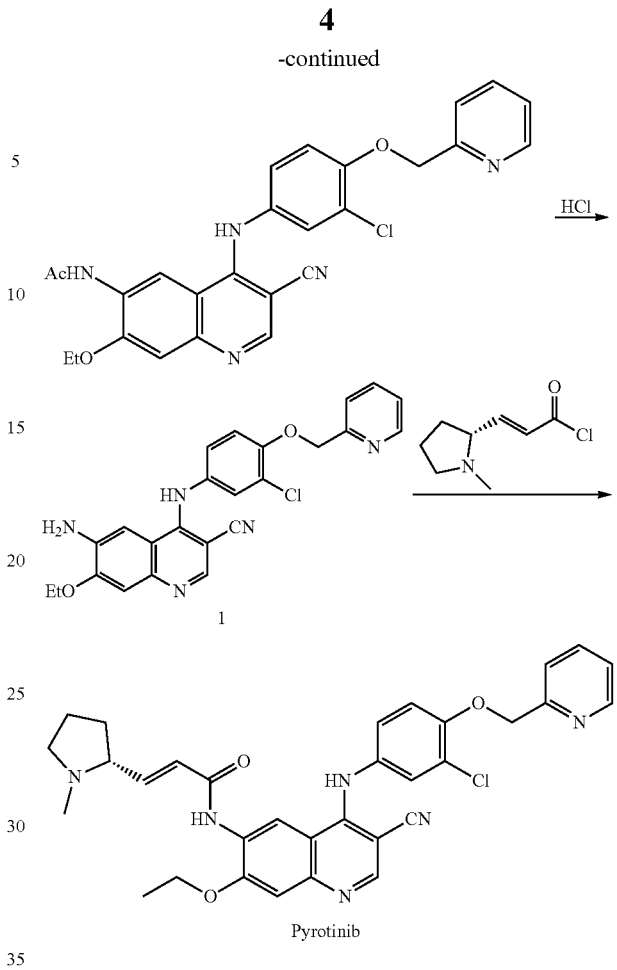

Route 2 (WO2019076316A1, CN101180269A) is shown below. In the route, the highly toxic and strongly acidic phosphorus oxychloride is also required for cyclization reaction in the second step, and the route also not suitable for industrial production.

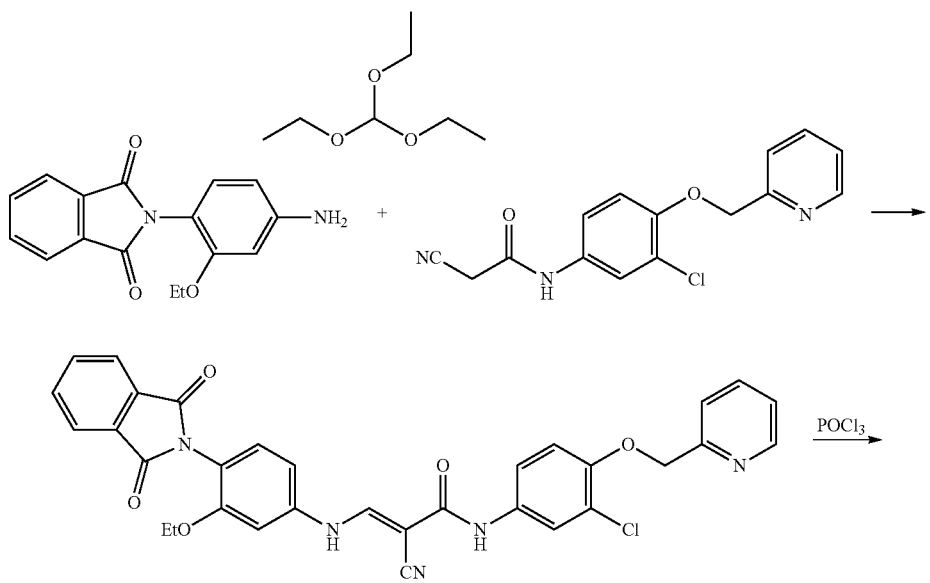

-continued

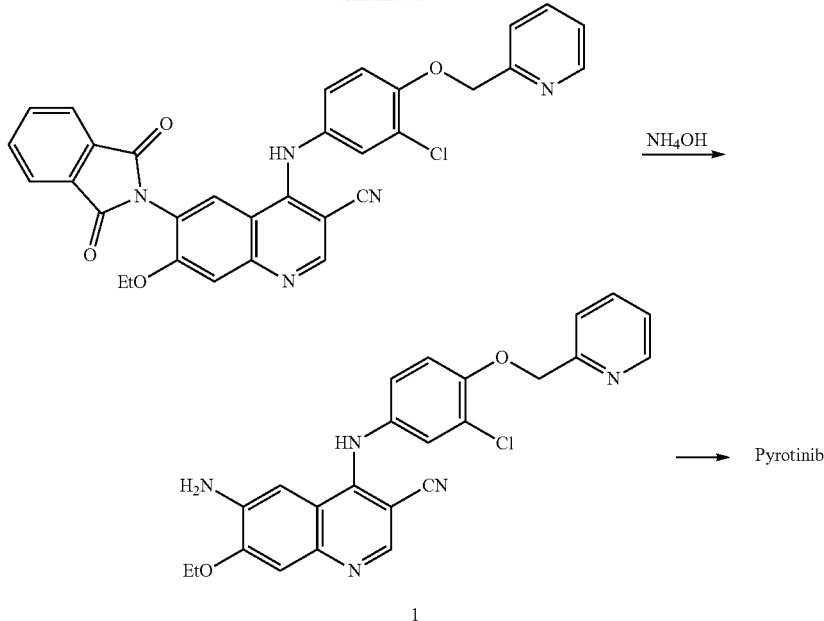

Route 3 (WO2011029265A1, WO2012122865A2) has the following reaction steps. (2R)-1-methylpyrrolidin-2-formaldehyde is unstable and prone to be oxidized and deteriorated, and additionally, there are no commercially available products. Thus, it needs to be synthesized in advance, and the synthesis is difficult and has high cost. On the other hand, the Wittig-Homer reaction between (2R)-1-methylpyrrolidin-2-formaldehyde and formula 2 needs to be carried out at ultralow temperature (less than −50° C.), and has a low yield. Therefore, this route has high cost, but low value and significance in industrial production.

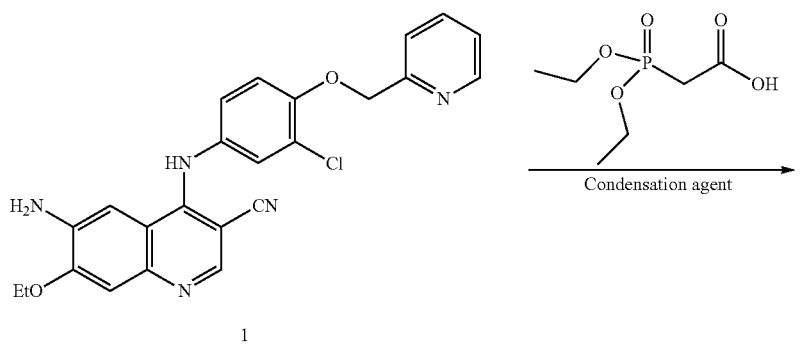

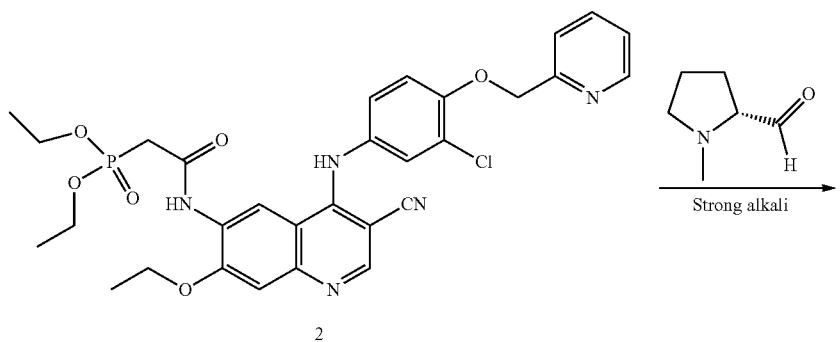

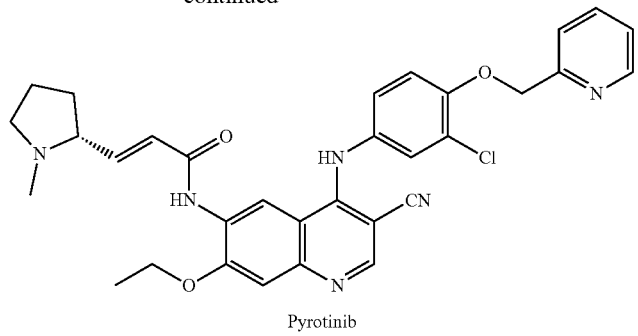

Pyrotinib

In view of the deficiencies in the existing art, it is of important and positive practical significance to explore the method for preparing pyrotinib with simple process, mild conditions, economy and environmental protection, high purity and high yield, especially to seek the technical solutions suitable for industrial production, so that the raw materials can reflect the economic and social values. The technical solutions to be introduced below are produced under such background.

SUMMARY

An object of the present application is to provide a method for preparing pyrotinib, which has the advantages of easily available raw materials, simple process, economy and environmental protection, and thus can meet the requirements of industrial production.

For the object of the present application, a method for preparing pyrotinib is provided, which includes the following steps:

(A) preparation of (R,E)-N-(2-hydroxy-4-nitrophenyl)-3-(1-methylpyrrolidin-2-yl)acrylamide:
  subjecting (2E)-3-[(2R)-1-methylpyrrolidin-2-yl]acrylic acid and 2-amino-5-nitrophenol to an amidation reaction in a solvent under the action of a condensation agent and an alkaline accelerator to obtain (R,E)-N-(2-hydroxy-4-nitrophenyl)-3-(1-methylpyrrolidin-2-yl)acrylamide;

(B) preparation of (R,E)-N-(2-ethoxy-4-nitrophenyl)-3-(1-methylpyrrolidin-2-yl)acrylamide:
  subjecting the (R,E)-N-(2-hydroxy-4-nitrophenyl)-3-(1-methylpyrrolidin-2-yl)acrylamide obtained in step (A) and bromoethane to a condensation etherification reaction in a solvent under the action of an acid-binding agent to obtain (R,E)-N-(2-ethoxy-4-nitrophenyl)-3-(1-methylpyrrolidin-2-yl)acrylamide;

(C) preparation of (R,E)-N-(4-amino-2-ethoxyphenyl)-3-(1-methylpyrrolidin-2-yl)acrylamide:
  subjecting the (R,E)-N-(2-ethoxy-4-nitrophenyl)-3-(1-methylpyrrolidin-2-yl)acrylamide obtained in step (B) to a nitro-reduction reaction in a solvent under the action of catalytic hydrogenation to obtain (R,E)-N-(4-amino-2-ethoxyphenyl)-3-(1-methylpyrrolidin-2-yl)acrylamide;

(D) preparation of (2E)-N-(4-amino-3-cyano-7-ethoxyquinoline-6-yl)-3-[(2R)-1-methylpyrrolidin-2-yl]acrylamide:
  subjecting the (R,E)-N-(4-amino-2-ethoxyphenyl)-3-(1-methylpyrrolidin-2-yl)acrylamide obtained in step (C), triethyl orthoformate and malononitrile to a heterocyclization reaction in a solvent to obtain (2E)-N-(4-amino-3-cyano-7-ethoxyquinoline-6-yl)-3-[(2R)-1-methylpyrrolidin-2-yl]acrylamide;

(E) preparation of pyrotinib:
  subjecting the (2E)-N-(4-amino-3-cyano-7-ethoxy quinoline-6-yl)-3-[(2R)-1-methylpyrrolidin-2-yl]acrylamide obtained in step (D) and 3-chloro-4-[(pyrid-2-yl)methoxy]-1-p-toluenesulfonyloxy benzene to a substitution reaction under the action of an acid-binding agent to obtain pyrotinib.

In a specific embodiment of the present application, (2E)-3-[(2R)-1-methylpyrrolidin-2-yl] acrylic acid and 2-amino-5-nitrophenol in step (A) have a molar ratio of 1:1.0-1.5.

In another specific embodiment of the present application, the condensation agent in step (A) is N,N'-carbonyldiimidazole (CDI), N,N'-dicyclohexylcarbodiimide, N,N'-diisopropyl carbodiimide, 1-ethyl-(3-dimethylaminopropyl)carbodiimide hydrochloride, 1-hydroxybenzo triazole, 1,8-diazabicyclo[5.4.0]undec-7-ene, N,N'-carbonyl-di-(1,2,4-triazole), O-benzotriazole-N,N,N',N'-tetramethyluronium hexafluorophosphate, O-benzotriazole-N,N,N',N'-tetramethyluronium tetrafluoroborate, 2-(7-azobenzotriazole)-N,N,N',N'-tetramethyluronium hexafluoro phosphate or 2-(7-azobenzotriazole)-N,N,N',N'-tetramethyluronium tetrafluoroborate; the alkaline accelerator is triethylamine, N,N-diisopropylethylamine, 2,6-dimethylpyridine, 4-dimethylaminopyridine, pyridine, piperidine, tri-n-butylamine, triisopropylamine, diisopropylamine, dicyclohexylamine, tetramethylguanidine, N-methylpyrrolidone, N-methylmorpholine or N-ethylmorpholine.

In another specific embodiment of the present application, the solvent in step (A) is toluene, xylene, ethyl acetate, isopropyl acetate, butyl acetate, N,N-dimethylformamide or acetonitrile; the amidation reaction has a temperature of 40-100° C.

In another embodiment of the present application, (R,E)-N-(2-hydroxy-4-nitrophenyl)-3-(1-methylpyrrolidin-2-yl)acrylamide and bromoethane in step (B) have a molar ratio of 1:3.0-6.0.

In another specific embodiment of the present application, the acid-binding agent is triethylamine, N,N-diisopropylethylamine, 2,6-dimethylpyridine, 4-dimethylaminopyridine, pyridine, sodium hydroxide, potassium hydroxide, potassium carbonate, sodium carbonate, potassium bicarbonate, sodium bicarbonate or cesium carbonate.

In another specific embodiment of the present application, the solvent in step (B) is N,N-dimethylformamide, N,N-dimethylacetamide, acetonitrile, toluene, 1,4-dioxane or methyl tert-butyl ether; the condensation etherification reaction has a temperature of 35-100° C.

In another specific embodiment of the present application, (R,E)-N-(4-amino-2-ethoxyphenyl)-3-(1-methylpyrrolidin-2-yl)acrylamide, triethyl orthoformate and malononitrile in step (D) have a molar ratio of 1:1.0-1.5:1.0-1.5; the solvent is dichloromethane, chloroform, 1,2-dichloroethane, acetonitrile, toluene, tetrahydrofuran, dimethyl carbonate or 1,4-dioxane; the heterocyclization reaction has a temperature of 50-120° C.

In another specific embodiment of the present application, (2E)-N-(4-amino-3-cyano-7-ethoxyquinoline-6-yl)-3-[(2R)-1-methylpyrrolidin-2-yl]acrylamide and 3-chloro-4-[(pyrid-2-yl)methoxy]-1-p-toluenesulfonyloxybenzene in step (E) have a feed molar ratio of 1:1.0-1.5.

In another specific embodiment of the present application, the acid-binding agent in step (E) is triethylamine, diethylamine, N,N-diisopropylethylamine, pyridine, piperidine, tri-n-butylamine, triisopropylamine, diisopropylamine, ethylenediamine, 8-hydroxyquinoline, piperazine, N-methylpiperazine, dicyclohexylamine, aniline, benzylamine, phenethylamine, N,N-dimethylaniline, N,N-diethylaniline, 2,6-dimethylpyridine, 4-dimethylaminopyridine, tetramethylguanidine, N-methylpyrrolidone, N-methylmorpholine, N-ethylmorpholine or 1,8-diazabicyclo[5.4.0]undec-7-ene; the solvent is toluene, xylene, tetrahydrofuran, N,N-dimethylformamide, N,N-dimethylacetamide, methyl tert-butyl ether or 1,4-dioxane; the substitution reaction has a temperature of 50-120° C.

Compared with the prior art, the technical solutions provided by the present application have the characteristics of easily available raw materials, simple process, economy and environmental protection, and are beneficial to improving and controlling the quality of the active pharmaceutical ingredient in final products, which meet the requirements of industrial production.

DETAILED DESCRIPTION

The technical solutions of the present application will be further illustrated with three specific embodiments below but not limited. Obviously, the protection scope of the present application is not limited to the embodiments, and other embodiments of the present application made by those skilled in the art all belong to the protection scope of the present application. In the embodiments, the raw material of 3-chloro-4-[(pyrid-2-yl)methoxy]-1-p-toluenesulfonyloxybenzene (CAS No.: 1882056-55-4) can be prepared by reacting 3-chloro-4-[(pyrid-2-yl) methoxy]phenol (CAS No.: 1331737-24-6) with p-toluenesulfonyl chloride, and 3-chloro-4-[(pyrid-2-yl)methoxy]phenol can be prepared with reference to the method for preparing the same compound in the document "Bioorganic & Medicinal Chemistry, 2013, Volume 21, Issue 11, Pages 3090-3104".

Example 1

(A) Preparation of (R,E)-N-(2-hydroxy-4-nitrophenyl)-3-(1-methylpyrrolidin-2-yl)acrylamide (2E)-3-[(2R)-1-methylpyrrolidin-2-yl]acrylic acid (15.0 g, 97 mmol), N,N'-carbonyldiimidazole (18.0 g, 111 mmol) and triethylamine (16.0 g, 158 mmol) were dissolved in toluene (800 mL), and cooled to less than or equal to 10° C., added with a toluene solution (25 mL) of 2-amino-5-nitrophenol (16.0 g, 104 mmol) dropwise, heated to 50° C. and reacted until TLC indicated that the reaction was completed, cooled to room temperature, concentrated under reduced pressure to remove the organic solvent, extracted with dichloromethane, washed with the salt aqueous solution, dried with anhydrous sodium sulfate, and dried by rotary evaporation under reduced pressure. The crude product was recrystallized from an isopropanol-ethyl acetate mixed solvent, and then dried in vacuum to obtain (R,E)-N-(2-hydroxy-4-nitrophenyl)-3-(1-methylpyrrolidin-2-yl)acrylamide (25.0 g) with a yield of 89%.

(B) Preparation of (R,E)-N-(2-ethoxy-4-nitrophenyl)-3-(1-methylpyrrolidin-2-yl)acrylamide (R,E)-N-(2-hydroxy-4-nitrophenyl)-3-(1-methylpyrrolidin-2-yl)acrylamide (25.0 g, 86 mmol) and triethylamine (30.0 g, 297 mmol) were dissolved in N,N-dimethylformamide (400 mL), and cooled to less than or equal to 10° C., added with a N,N-dimethylformamide solution (60 mL) of bromoethane (28.0 g, 257 mmol) dropwise and slowly, heated to 45° C. and reacted until TLC indicated that the reaction was completed, cooled to room temperature, rotary-evaporated under reduced pressure to remove the organic solvent, extracted with dichloromethane, washed with the salt aqueous solution, dried with anhydrous sodium sulfate, and dried by rotary evaporation under reduced pressure. The crude product was recrystallized from an isopropanol-ethyl acetate mixed solvent, and then dried in vacuum to obtain (R,E)-N-(2-ethoxy-4-nitrophenyl)-3-(1-methylpyrrolidin-2-yl)acrylamide (26.0 g) with a yield of 95%.

(C) Preparation of (R,E)-N-(4-amino-2-ethoxyphenyl)-3-(1-methylpyrrolidin-2-yl)acrylamide (R,E)-N-(2-ethoxy-4-nitrophenyl)-3-(1-methylpyrrolidin-2-yl)acrylamide (26.0 g, 81 mmol) was dissolved in methanol (150 mL), added with palladium on carbon (3.0 g), introduced hydrogen and reacted at 30° C. for 18 h under atmospheric pressure. The catalyst was removed by suction filtration with diatomite, and the filtrate was concentrated to dryness by rotary evaporation to obtain (R,E)-N-(4-amino-2-ethoxyphenyl)-3-(1-methylpyrrolidin-2-yl) acrylamide (22.0 g) with a yield of 93%.

(D) Preparation of (2E)-N-(4-amino-3-cyano-7-ethoxyquinoline-6-yl)-3-[(2R)-1-methylpyrrolidin-2-yl]acrylamide (R,E)-N-(4-amino-2-ethoxyphenyl)-3-(1-methylpyrrolidin-2-yl)acrylamide (22.0 g, 76 mmol) and triethyl orthoformate (13.0 g, 88 mmol) were dissolved in chloroform (300 mL), cooled to 15° C., added with a chloroform solution (20 mL) of malononitrile (6.0 g, 91 mmol) dropwise and slowly, heated to 80° C. and reacted for 20 h. When the reaction was completed, the reaction solution was quenched by adding water dropwise, and rotary-evaporated under reduced pressure to remove the organic solvent, extracted with dichloromethane, washed with the salt aqueous solution, dried with anhydrous sodium sulfate, and dried by rotary evaporation under reduced pressure. The crude product was recrystallized from an ethyl acetate-n-hexane mixed solvent, and then dried in vacuum to obtain (2E)-N-(4-amino-3-cyano-7-ethoxyquinoline-6-yl)-3-[(2R)-1-methylpyrrolidin-2-yl]acrylamide (25.0 g) with a yield of 90%.

(E) Preparation of Pyrotinib (2E)-N-(4-amino-3-cyano-7-ethoxyquinoline-6-yl)-3-[(2R)-1-methylpyrrolidin-2-yl]acrylamide (25.0 g, 68 mmol) and 3-chloro-4-[(pyrid-2-yl)methoxy]-1-p-toluenesulfonyloxybenzene (32.0 g, 82 mmol) were dissolved in toluene (600 mL), added with N,N-diisopropylethylamine (13.0 g, 101 mmol), heated to 60° C. and reacted until TLC indicated that the reaction was completed, cooled to room temperature, rotary-evaporated under reduced pressure to remove the organic solvent, extracted with dichloromethane, washed with the salt aqueous solution, dried with anhydrous sodium sulfate, and dried by rotary evaporation under reduced pressure. The crude product was recrystallized from an isopropanol-ethyl acetate mixed solvent, and then dried in vacuum to obtain pyrotinib (34.0 g) with a yield of 85%.

The preparation route or process route of this example is as follows:

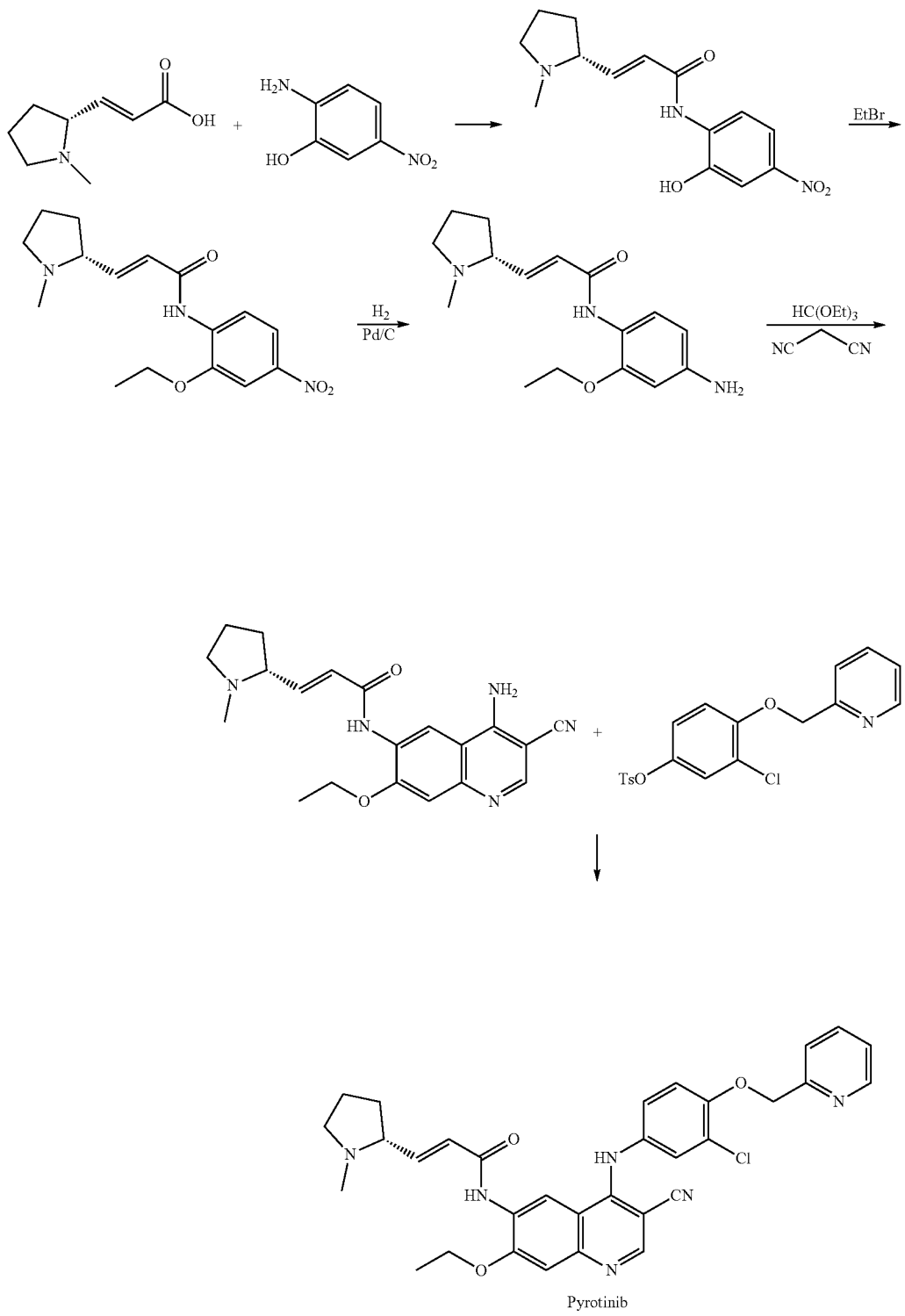

Example 2

(A) Preparation of (R,E)-N-(2-hydroxy-4-nitrophenyl)-3-(1-methylpyrrolidin-2-yl)acrylamide (2E)-3-[(2R)-1-methylpyrrolidin-2-yl]acrylic acid (25.0 g, 0.16 mol), 1,8-diazabicyclo[5.4.0]undec-7-ene (34.0 g, 0.22 mol) and N,N-diisopropylethylamine (37.0 g, 0.29 mol) were dissolved in isopropyl acetate (1000 mL), and cooled to less than or equal to 10° C., added with an isopropyl acetate solution (80 mL) of 2-amino-5-nitrophenol (32.0 g, 0.21 mol) dropwise, heated to 80° C. and reacted until TLC indicated that the reaction was completed, cooled to room temperature, concentrated under reduced pressure to remove the organic solvent, extracted with dichloromethane, washed with the salt aqueous solution, dried with anhydrous sodium sulfate, and dried by rotary evaporation under reduced pressure. The crude product was recrystallized from an isopropanol-ethyl acetate mixed solvent, and then dried in vacuum to obtain (R,E)-N-(2-hydroxy-4-nitrophenyl)-3-(1-methylpyrrolidin-2-yl)acrylamide (40.0 g) with a yield of 85%.

(B) Preparation of (R,E)-N-(2-ethoxy-4-nitrophenyl)-3-(1-methylpyrrolidin-2-yl)acrylamide (R,E)-N-(2-hydroxy-4-nitrophenyl)-3-(1-methylpyrrolidin-2-yl)acrylamide (40.0 g, 0.14 mol) and sodium hydroxide (19.0 g, 0.48 mol) were dissolved in N,N-dimethylformamide (800 mL), and cooled to less than or equal to 10° C., added with a N,N-dimethylformamide solution (100 mL) of bromoethane (60.0 g, 0.55 mol) dropwise and slowly, heated to 45° C. and reacted until TLC indicated that the reaction was completed, cooled to room temperature, rotary-evaporated under reduced pressure to remove the organic solvent, extracted with dichloromethane, washed with the salt aqueous solution, dried with anhydrous sodium sulfate, and dried by rotary evaporation under reduced pressure. The crude product was recrystallized from an isopropanol-ethyl acetate mixed solvent, and then dried in vacuum to obtain (R,E)-N-(2-ethoxy-4-nitrophenyl)-3-(1-methylpyrrolidin-2-yl)acrylamide (42.0 g) with a yield of 96%.

(C) Preparation of (R,E)-N-(4-amino-2-ethoxyphenyl)-3-(1-methylpyrrolidin-2-yl)acrylamide (R,E)-N-(2-ethoxy-4-nitrophenyl)-3-(1-methylpyrrolidin-2-yl)acrylamide (42.0 g, 0.13 mol) was dissolved in ethyl alcohol (200 mL), added with palladium on carbon (5.0 g), introduced hydrogen and reacted at 35° C. for 14 h under atmospheric pressure. The catalyst was removed by suction filtration with diatomite, and the filtrate was concentrated to dryness by rotary evaporation to obtain (R,E)-N-(4-amino-2-ethoxyphenyl)-3-(1-methylpyrrolidin-2-yl)acrylamide (36.0 g) with a yield of 95%.

(D) Preparation of (2E)-N-(4-amino-3-cyano-7-ethoxyquinoline-6-yl)-3-[(2R)-1-methylpyrrolidin-2-yl]acrylamide (R,E)-N-(4-amino-2-ethoxyphenyl)-3-(1-methylpyrrolidin-2-yl)acrylamide (36.0 g, 0.12 mol) and triethyl orthoformate (28.0 g, 0.19 mol) were dissolved in 1,4-dioxane (500 mL), cooled to 15° C., added with a 1,4-dioxane solution (30 mL) of malononitrile (12 g, 0.18 mol) dropwise and slowly, heated to 95° C. and reacted for 15 h. When the reaction was completed, the reaction solution was quenched by adding water dropwise, and rotary-evaporated under reduced pressure to remove the organic solvent, extracted with dichloromethane, washed with the salt aqueous solution, dried with anhydrous sodium sulfate, and dried by rotary evaporation under reduced pressure. The crude product was recrystallized from an ethyl acetate-n-hexane mixed solvent, and then dried in vacuum to obtain (2E)-N-(4-amino-3-cyano-7-ethoxyquinoline-6-yl)-3-[(2R)-1-methylpyrrolidin-2-yl]acrylamide (41.0 g) with a yield of 90%.

(E) Preparation of Pyrotinib (2E)-N-(4-amino-3-cyano-7-ethoxyquinoline-6-yl)-3-[(2R)-1-methylpyrrolidin-2-yl]acrylamide (41.0 g, 0.11 mol) and 3-chloro-4-[(pyrid-2-yl)methoxy]-1-p-toluenesulfonyloxybenzene (58.0 g, 0.15 mmol) were dissolved in toluene (500 mL), added with triethylamine (18.0 g, 0.18 mol), heated to 90° C. and reacted until TLC indicated that the reaction was completed, cooled to room temperature, rotary-evaporated under reduced pressure to remove the organic solvent, extracted with dichloromethane, washed with the salt aqueous solution, dried with anhydrous sodium sulfate, and dried by rotary evaporation under reduced pressure. The crude product was recrystallized from an isopropanol-ethyl acetate mixed solvent, and then dried in vacuum to obtain pyrotinib 57.0 g) with a yield of 87%. The preparation route or process route of this example is the same as that of Example 1.

Example 3

(A) Preparation of (R,E)-N-(2-hydroxy-4-nitrophenyl)-3-(1-methylpyrrolidin-2-yl)acrylamide (2E)-3-[(2R)-1-methylpyrrolidin-2-yl]acrylic acid (75.0 g, 0.48 mol), N,N'-carbonyldiimidazole (160.0 g, 0.78 mol) and pyridine (80.0 g, 1.0 mol) were dissolved in acetonitrile (1000 mL), and cooled to less than or equal to 10° C., added with a acetonitrile solution (150 mL) of 2-amino-5-nitrophenol (112.0 g, 0.73 mol) dropwise, heated to 90° C. and reacted until TLC indicated that the reaction was completed, cooled to room temperature, concentrated under reduced pressure to remove the organic solvent, extracted with dichloromethane, washed with the salt aqueous solution, dried with anhydrous sodium sulfate, and dried by rotary evaporation under reduced pressure. The crude product was recrystallized from an isopropanol-ethyl acetate mixed solvent, and then dried in vacuum to obtain (R,E)-N-(2-hydroxy-4-nitrophenyl)-3-(1-methylpyrrolidin-2-yl)acrylamide (125.0 g) with a yield of 89%.

(B) Preparation of (R,E)-N-(2-ethoxy-4-nitrophenyl)-3-(1-methylpyrrolidin-2-yl)acrylamide (R,E)-N-(2-hydroxy-4-nitrophenyl)-3-(1-methylpyrrolidin-2-yl)acrylamide (125.0 g, 0.43 mol) and N,N-diisopropylethylamine (250.0 g, 1.93 mol) were dissolved in methyl tert-butyl ether (1800 mL), and cooled to less than or equal to 10° C., added with a methyl tert-butyl ether solution (250 mL) of bromoethane (188.0 g, 1.73 mol) dropwise and slowly, heated to 50° C. and reacted until TLC indicated that the reaction was completed, cooled to room temperature, rotary-evaporated under reduced pressure to remove the organic solvent, extracted with dichloromethane, washed with the salt aqueous solution, dried with anhydrous sodium sulfate, and dried by rotary evaporation under reduced pressure. The crude product was recrystallized from an isopropanol-ethyl acetate mixed solvent, and then dried in vacuum to obtain (R,E)-N-(2-ethoxy-4-nitrophenyl)-3-(1-methylpyrrolidin-2-yl)acrylamide (133.0 g) with a yield of 97%.

(C) Preparation of (R,E)-N-(4-amino-2-ethoxyphenyl)-3-(1-methylpyrrolidin-2-yl)acrylamide (R,E)-N-(2-ethoxy-4-nitrophenyl)-3-(1-methylpyrrolidin-2-yl)acrylamide (133.0 g, 0.42 mol) was dissolved in isopropanol (1000 mL), added with palladium on carbon (18.0 g), introduced hydrogen and reacted at 45° C. for 10 h under atmospheric pressure. The catalyst was removed by suction filtration with diatomite, and the filtrate was concentrated to dryness by rotary evaporation to obtain (R,E)-N-(4-amino-2-ethoxyphenyl)-3-(1-methylpyrrolidin-2-yl)acrylamide (115.0 g) with a yield of 95%.

(D) Preparation of (2E)-N-(4-amino-3-cyano-7-ethoxyquinoline-6-yl)-3-[(2R)-1-methylpyrrolidin-2-yl]acrylamide (R,E)-N-(4-amino-2-ethoxyphenyl)-3-(1-methylpyrrolidin-2-yl)acrylamide (115.0 g) and triethyl orthoformate (77.0 g, 0.52 mol) were dissolved in 1,2-dichloroethane (1600 mL), cooled to 15° C., added with a 1,2-dichloroethane solution (60 mL) of malononitrile (34.0 g, 0.51 mol) dropwise and slowly, heated to 100° C. and reacted for 8 h. When the reaction was completed, the reaction solution was quenched by adding water dropwise, and rotary-evaporated under reduced pressure to remove the organic solvent, extracted with dichloromethane, washed with the salt aqueous solution, dried with anhydrous sodium sulfate, and dried by rotary evaporation under reduced pressure. The crude product was recrystallized from an ethyl acetate-n-hexane mixed solvent, and then dried in vacuum to obtain (2E)-N-(4-amino-3-cyano-7-ethoxyquinoline-6-yl)-3-[(2R)-1-methylpyrrolidin-2-yl]acrylamide (135.0 g) with a yield of 93%.

(E) Preparation of Pyrotinib (2E)-N-(4-amino-3-cyano-7-ethoxyquinoline-6-yl)-3-[(2R)-1-methylpyrrolidin-2-yl]acrylamide (135.0 g, 0.37 mol) and 3-chloro-4-[(pyrid-2-yl)methoxy]-1-p-toluenesulfonyloxybenzene (210.0 g, 0.54 mol) were dissolved in N,N-dimethylformamide (1500 mL), added with N,N-diisopropylethylamine (72.0 g, 0.56 mol), heated to 100° C. and reacted until TLC indicated that the reaction was completed, cooled to room temperature, rotary-evaporated under reduced pressure to remove the organic solvent, extracted with dichloromethane, washed with the salt aqueous solution, dried with anhydrous sodium sulfate, and dried by rotary evaporation under reduced pressure. The crude product was recrystallized from an isopropanol-ethyl acetate mixed solvent, and then dried in vacuum to obtain pyrotinib (190.0 g) with a yield of 88%. The preparation route or process route of this example is the same as that of Example 1.

What is claimed is:
1. A method for preparing pyrotinib, comprising the following steps:
(A) preparation of (R,E)-N-(2-hydroxy-4-nitrophenyl)-3-(1-methylpyrrolidin-2-yl)acrylamide:
subjecting (2E)-3-[(2R)-1-methylpyrrolidin-2-yl]acrylic acid and 2-amino-5-nitrophenol to an amidation reaction in a solvent under the action of a condensation agent and an alkaline accelerator to obtain (R,E)-N-(2-hydroxy-4-nitrophenyl)-3-(1-methylpyrrolidin-2-yl)acrylamide;
(B) preparation of (R,E)-N-(2-ethoxy-4-nitrophenyl)-3-(1-methylpyrrolidin-2-yl)acrylamide:
subjecting the (R,E)-N-(2-hydroxy-4-nitrophenyl)-3-(1-methylpyrrolidin-2-yl)acrylamide obtained in step (A) and bromoethane to a condensation etherification reaction in a solvent under the action of an acid-binding agent to obtain (R,E)-N-(2-ethoxy-4-nitrophenyl)-3-(1-methylpyrrolidin-2-yl)acrylamide;
(C) preparation of (R,E)-N-(4-amino-2-ethoxyphenyl)-3-(1-methylpyrrolidin-2-yl)acrylamide:
subjecting the (R,E)-N-(2-ethoxy-4-nitrophenyl)-3-(1-methylpyrrolidin-2-yl)acrylamide obtained in step (B) to a nitro-reduction reaction in a solvent under the action of catalytic hydrogenation to obtain (R,E)-N-(4-amino-2-ethoxyphenyl)-3-(1-methylpyrrolidin-2-yl)acrylamide;
(D) preparation of (2E)-N-(4-amino-3-cyano-7-ethoxyquinoline-6-yl)-3-[(2R)-1-methylpyrrolidin-2-yl]acrylamide:
subjecting the (R,E)-N-(4-amino-2-ethoxyphenyl)-3-(1-methylpyrrolidin-2-yl)acrylamide obtained in step (C), triethyl orthoformate and malononitrile to a heterocyclization reaction in a solvent to obtain (2E)-N-(4-amino-3-cyano-7-ethoxyquinoline-6-yl)-3-[(2R)-1-methylpyrrolidin-2-yl]acrylamide;
(E) preparation of pyrotinib:
subjecting the (2E)-N-(4-amino-3-cyano-7-ethoxyquinoline-6-yl)-3-[(2R)-1-methylpyrrolidin-2-yl]acrylamide obtained in step (D) and 3-chloro-4-[(pyrid-2-yl)methoxy]-1-p-toluenesulfonyloxy benzene to a substitution reaction under the action of an acid-binding agent to obtain pyrotinib.

2. The method for preparing pyrotinib according to claim 1, wherein (2E)-3-[(2R)-1-methylpyrrolidin-2-yl]acrylic acid and 2-amino-5-nitrophenol in step (A) have a molar ratio of 1:1.0-1.5.

3. The method for preparing pyrotinib according to claim 1, wherein the condensation agent in step (A) is N,N'-carbonyldiimidazole (CDI), N,N'-dicyclohexylcarbodiimide, N,N'-diisopropyl carbodiimide, 1-ethyl-(3-dimethylaminopropyl)carbodiimide hydrochloride, 1-hydroxybenzo triazole, 1,8-diazabicyclo[5.4.0]undec-7-ene, N,N'-carbonyl-di-(1,2,4-triazole), O-benzotriazole-N,N,N',N'-tetramethyluronium hexafluorophosphate, O-benzotriazole-N,N,N',N'-tetramethyl uronium tetrafluoroborate, 2-(7-azobenzotriazole)-N,N,N',N'-tetramethyluronium hexafluoro phosphate or 2-(7-azobenzotriazole)-N,N,N',N'-tetramethyluronium tetrafluoroborate;
the alkaline accelerator is triethylamine, N,N-diisopropylethylamine, 2,6-dimethylpyridine, 4-dimethylaminopyridine, pyridine, piperidine, tri-n-butylamine, triisopropylamine, diisopropylamine, dicyclohexylamine, tetramethylguanidine, N-methylpyrrolidone, N-methylmorpholine or N-ethylmorpholine.

4. The method for preparing pyrotinib according to claim 1, wherein the solvent in step (A) is toluene, xylene, ethyl acetate, isopropyl acetate, butyl acetate, N,N-dimethylformamide or acetonitrile; the amidation reaction has a temperature of 40-100° C.

5. The method for preparing pyrotinib according to claim 1, wherein (R,E)-N-(2-hydroxy-4-nitrophenyl)-3-(1-methylpyrrolidin-2-yl)acrylamide and bromoethane in step (B) have a molar ratio of 1:3.0-6.0.

6. The method for preparing pyrotinib according to claim 1, wherein the acid-binding agent in step (B) is triethylamine, N,N-diisopropylethylamine, 2,6-dimethylpyridine, 4-dimethylaminopyridine, pyridine, sodium hydroxide, potassium hydroxide, potassium carbonate, sodium carbonate, potassium bicarbonate, sodium bicarbonate or cesium carbonate.

7. The method for preparing pyrotinib according to claim 1, the solvent in step (B) is N,N-dimethylformamide, N,N-dimethylacetamide, acetonitrile, toluene, 1,4-dioxane or methyl tert-butyl ether; the condensation etherification reaction has a temperature of 35-100° C.

8. The method for preparing pyrotinib according to claim 1, wherein (R,E)-N-(4-amino-2-ethoxyphenyl)-3-(1-methylpyrrolidin-2-yl)acrylamide, triethyl orthoformate and malononitrile in step (D) have a molar ratio of 1:1.0-1.5:1.0-1.5; the solvent is dichloromethane, chloroform, 1,2-dichloroethane, acetonitrile, toluene, tetrahydrofuran, dimethyl carbonate or 1,4-dioxane; the heterocyclization reaction has a temperature of 50-120° C.

9. The method for preparing pyrotinib according to claim 1, (2E)-N-(4-amino-3-cyano-7-ethoxyquinoline-6-yl)-3-[(2R)-1-methylpyrrolidin-2-yl]acrylamide and 3-chloro-4-[(pyrid-2-yl)methoxy]-1-p-toluenesulfonyloxybenzene in step (E) have a feed molar ratio of 1:1.0-1.5.

10. The method for preparing pyrotinib according to claim 1, wherein the acid-binding agent in step (E) is triethylamine, diethylamine, N,N-diisopropylethylamine, pyridine, piperidine, tri-n-butylamine, triisopropylamine, diisopropylamine, ethylenediamine, 8-hydroxyquinoline, piperazine, N-methylpiperazine, dicyclohexylamine, aniline, benzylamine, phenethylamine, N,N-dimethylaniline, N,N-diethylaniline, 2,6-dimethylpyridine, 4-dimethylaminopyridine, tetramethylguanidine, N-methylpyrrolidone, N-methylmorpholine, N-ethylmorpholine or 1,8-diazabicyclo[5.4.0]undec-7-ene; the solvent is toluene, xylene, tetrahydrofuran, N,N-dimethylformamide, N,N-dimethylacetamide, methyl tert-butyl ether or 1,4-dioxane; the substitution reaction has a temperature of 50-120° C.

\* \* \* \* \*